Dec. 11, 1956　　　　　　　　E. RIEDEL　　　　　　　2,773,600
PLANT FOR THE CLARIFICATION OF SLURRIES
Filed Jan. 21, 1953
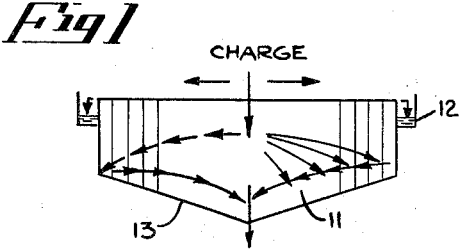
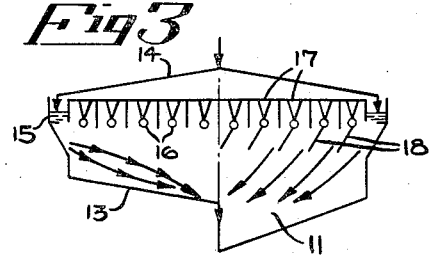
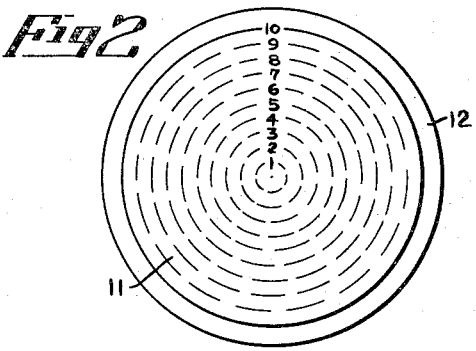
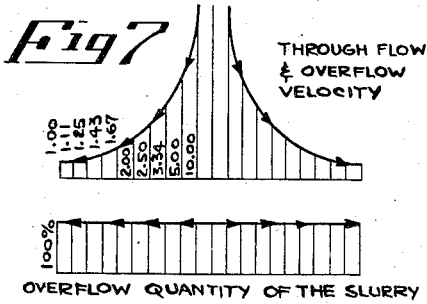

United States Patent Office 2,773,600
Patented Dec. 11, 1956

2,773,600

PLANT FOR THE CLARIFICATION OF SLURRIES

Erich Riedel, Dusseldorf, Germany, assignor to Brueckenbau Flender G. m. b. H., Dusseldorf, Germany, a corporation of Germany Application January 21, 1953, Serial No. 332,198

Claims priority, application Germany January 29, 1952

1 Claim. (Cl. 210—51)

This invention relates to a method for the clarification of slurries and wash waters; it also relates to clarification plants for slurries and for wash water and particularly to thickeners and settling tanks. The solid particles suspended in the wash water and slurries are settled in these tanks deposited by the action of gravity and converted into a sludge which is downwardly conducted into and through the settling tanks, whereas a purified liquid is circumferentially overflown from the same.

In these clarifiers the slurries and liquids to be liberated from suspended solids are conducted into the center portion of the settling tank; from here the liquids are peripherally distributed and made to overflow over the edge of the tanks, whereas the solid particles are deposited upon the bottom.

The settling and purifying action of these tanks is slow; moreover, their efficiency is poor due to a mistaken utilization of the disposable settling spaces. The reason for the failing efficiency of the known settling tanks is the introduction of the liquids into the center thereof. Whereas an immediate flow-quieting and retarding action should be applied to enable a quick settling of the solid particles, a considerable flow speed of the water results in the known sedimentation tanks in the vicinity of or in their center portion; moreover, the entering slurry meets a relatively small surface area; the flow speed is further reduced at the circumference of the tanks to about zero by the flow retarding action of the flown-through large cross section of the tanks. As a consequence thereof the deposition of the solids is greatly retarded; the solid particles are first carried to the outer zones of the sedimentation or settling tanks, deposited on their bottom and transported by a scraper to a center discharge opening. Even if the scraper is operated at a small speed it will stir up fine particles and cause renewed turbidity. If no scraper is used, the downward slope of the tank bottom must be increased, which increases the space requirements of the settling tanks. The further disadvantage arises that the total water overflow must pass through all cross sections of the tank from the center to the edge without provision of intermediary discharge openings for a quicker removal of the purified wash water and for a correspondingly increased purifying capacity of the tanks.

It is the main object of this invention to create a quiet entrance and flow speed of the slurries, which is gradually reduced as the slurry moves through the settling tanks.

It is also an important object of the invention to increase the sedimentation speed of the larger slurry particles by a reduction of their suspension capacity.

With these and additional objects in view the invention will now be described more in detail and with reference to the accompanying drawings illustrating a particularly efficient manner of carrying the same into effect.

In the drawings:

Figure 1 is a vertical sectional view of a customary settling tank for slurries and fine particle suspensions;

Figure 2 is a plan view of the tank shown in Figure 1 and subdivided by dotted lines in ten fictional circular settling zones;

Figure 3 is a vertical sectional view of a settling tank constructed in conformity with the invention, the right side of the tank being provided with guide plates;

Figure 4 is a plan view of the settling tank shown in Figure 3;

Figures 5 and 6 show diagrams of the surface area and of the periphery and cross sections of the customary settling tanks;

Figures 7 and 8 illustrate a diagrammatical comparison of the flow velocity and overflow velocity of the customary settling tanks and of those constructed in conformity with the invention;

Figures 9 and 10 show a corresponding comparison of the overflow quantities of the slurries;

Figures 11 and 12 show a corresponding comparison of the quantity of solids, of the relationship of the solids and liquids and of the grain size of the deposited particles.

In conformity with Figures 1 and 2 the slurry is entered into the center portion of the settling tank 11; it is distributed from the center towards the periphery of the tank in the shape of circular zones, which are indicated as fictional annular cross sectional sections 1 to 10. The purified slurry is discharged through the circumferential overflow channel 12. The solid particles are deposited upon the funnel-shaped bottom 13 of the tank 11 and are discharged through an opening provided in the lowermost center portion thereof.

From the diagrams shown in Figures 5, 6, 7, 9, 11 it is apparent that the through-flow speed and the overflow speed, see Figure 7, reaches a maximum in the center of the settling tank and from here is gradually reduced towards its circumference. The same applies to the quantity and the grain size of the deposits as well as to the relationship between the solids and liquids (see Figures 7, 11); the overflow quantity, however, is all over the same, see Figure 9.

In order to eliminate these disadvantages, see Figures 3, 4, the slurry is charged by means of the turnstile 14 into a trough 15 located at the periphery of the settling tank 11; the slurry flows into the center portion of the settling tank 11; the flow of the slurry may be stopped. In this manner a quiet inflow is attained of the slurry, which due to its being charged along the entire tank periphery finds immediately upon entry into the same a maximum through-flow portion, whereby a quiet deposition is attained of the suspended solid particles; it is obvious that their capacity of remaining suspended is immediately eliminated and that practically the gravity only acts upon the same.

The use of the turnstile 14 is recommended to obtain a uniform distribution of the slurry along the entire edge of the settling tank 11.

The introduction of the slurry into the settling tank may also be effected by troughs, tubes and similar means.

In order to intensify the action of the calming cross sections in the tanks and to quickly reduce the quantity of the purified wash water a plurality, for instance, five concentric pipes 16 are provided; moreover, spaced overflow funnels 17 are located upon these pipes for the conduct of the purified water into the same and its withdrawal therefrom.

Inclined guide plates 18 may be fastened to the tubes, see right side of Figure 3, whereby an accelerated deposition is effected of the solid particles and a quick conduct thereof towards the center of the tank bottom.

The overflow water need not flow through the entire cross area of the plant, but may be removed through a first and a few successive overflow zones. In this manner with a small space requirement and a large operative capacity the removal of a fluid, which is practically free from solids, is attained; bottom scrapers are not required.

The sludge is automatically collected in the bottom funnel and discharged from the same. The inclined guide plates improve the settling of the solids and the transport thereof into a center opening provided in the bottom of the tank.

From the diaphragms shown in Figures 8, 10, 12, it is apparent that with the instant settling installation the throughflow and overflow velocity through all cross sections of the settling tank is small and uniform and much smaller as in the known settling tanks.

The overflow quantity decreases from the periphery towards the center of the settling tank; the same is true of the quantity and grain size of the solids and the relationship between solids and fluid.

Since certain changes in carrying out the above process could be made without departing from the scope thereof, it is intended that all matter contained in the above description or shown in the accompanying drawings shall be interpreted as illustrative and not in a limiting sense.

I claim:

A device for the clarification of slurries and particularly of water comprising a circular settling tank, a circumferential trough at the upper edge of said settling tank for charging the slurries into said tank, a plurality of circular rows of overflow discharge tubes concentrically located in said tank at substantially the same level as said charging trough, overflow funnels attached to the open top of said tubes and connected therewith for the discharge of the clarified slurries, a turnstile located at the top portion of said tank the outlets from said turnstile extending into the circumferential charging trough and circular guide plates for the liquid to be discharged, said plates being attached to the bottom portion of said tubes and inwardly inclined towards the center of said tank.

References Cited in the file of this patent

UNITED STATES PATENTS

| | | |
|---|---|---|
| 1,024,451 | Linden | Apr. 23, 1912 |
| 1,526,197 | Ahlqvist | Feb. 10, 1925 |
| 2,069,989 | Adams | Feb. 9, 1937 |
| 2,092,620 | Kivell | Sept. 7, 1937 |
| 2,185,785 | Dorr et al. | Jan. 2, 1940 |
| 2,509,933 | Lind | May 30, 1950 |
| 2,635,757 | Walker | Apr. 21, 1953 |
| 2,635,758 | Walker | Apr. 21, 1953 |